(12) United States Patent
Yoon et al.

(10) Patent No.: US 8,897,980 B2
(45) Date of Patent: Nov. 25, 2014

(54) METHOD OF ESTIMATING TRANSMISSION TORQUE OF DRY CLUTCH OF VEHICLE

(71) Applicants: Hyundai Motor Company, Seoul (KR); Kia Motors Corp., Seoul (KR)

(72) Inventors: Young Min Yoon, Seoul (KR); Seung Sam Baek, Jeju-si (KR); Sung Hyun Cho, Suwon-si (KR); Ho Young Lee, Bucheon-si (KR); Joung Chul Kim, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/794,178

(22) Filed: Mar. 11, 2013

(65) Prior Publication Data

US 2014/0121926 A1 May 1, 2014

(30) Foreign Application Priority Data

Oct. 30, 2012 (KR) .................. 10-2012-0121628

(51) Int. Cl.
*F16H 61/14* (2006.01)
*F16D 48/06* (2006.01)
*F16H 61/04* (2006.01)
F16D 43/26 (2006.01)
F16D 43/02 (2006.01)
F16D 43/00 (2006.01)
B60W 10/02 (2006.01)

(52) U.S. Cl.
CPC ............... *F16D 48/06* (2013.01); *F16D 43/26* (2013.01); *F16D 43/02* (2013.01); *F16D 43/00* (2013.01); *B60W 10/02* (2013.01); *F16H 61/0437* (2013.01)
USPC ............ 701/68; 701/67; 477/168; 477/169; 477/171; 477/173; 477/181; 192/13 R; 192/3.58; 192/54.1; 192/84.6

(58) Field of Classification Search
CPC ........ B60W 10/02; F16D 48/00; F16D 43/26; F16D 43/02; F16H 61/0437
USPC ............ 701/67, 68; 192/215, 216, 84.6, 3.58, 192/13 R, 54.1; 477/5, 34, 171, 173, 181; 180/245
See application file for complete search history.

(56) References Cited

U.S. PATENT DOCUMENTS 4,574,926 A 3/1986 Bubak
4,618,043 A 10/1986 Hattori et al.
(Continued)

FOREIGN PATENT DOCUMENTS

JP 2004-270624 A 9/2004
JP 2010-144851 A 7/2010

*Primary Examiner* — Thomas Tarcza
*Assistant Examiner* — Tyler J Lee
(74) *Attorney, Agent, or Firm* — Morgan, Lewis & Bockius LLP

(57) ABSTRACT

A method of estimating transmission torque of a dry clutch, may include a) slowly releasing a dry clutch until a slip of the dry clutch occurs, b) acquiring and storing stroke of an actuator and torque of an engine at a starting time point at which the slip of the dry clutch occurs at step a), and c) determining the stroke of the actuator and the transmission torque of the dry clutch at the starting time point at which the slip of the dry clutch occurs, by using the stroke of the actuator and the torque of the engine stored at step b).

6 Claims, 3 Drawing Sheets

(56) References Cited

U.S. PATENT DOCUMENTS

| | | | |
|---|---|---|---|
| 4,867,287 A | 9/1989 | Hayashi | |
| 4,969,545 A * | 11/1990 | Hayashi | 477/176 |
| 5,020,645 A | 6/1991 | Sasa | |
| 5,211,080 A | 5/1993 | Leising et al. | |
| 5,282,401 A * | 2/1994 | Hebbale et al. | 475/123 |
| 5,935,043 A * | 8/1999 | Watanabe et al. | 477/169 |
| 8,332,111 B2 | 12/2012 | McDonnell et al. | |
| 2010/0279818 A1* | 11/2010 | Soliman et al. | 477/5 |
| 2012/0109477 A1 | 5/2012 | McDonnell et al. | |
| 2012/0298466 A1* | 11/2012 | Nedachi et al. | 192/84.6 |
| 2013/0018556 A1 | 1/2013 | Williams et al. | |

\* cited by examiner

METHOD OF ESTIMATING TRANSMISSION TORQUE OF DRY CLUTCH OF VEHICLE

CROSS-REFERENCE TO RELATED APPLICATION

The present application claims priority to Korean Patent Application No. 10-2012-0121628, filed on Oct. 30, 2012, the entire contents of which is incorporated herein for all purposes by this reference.

BACKGROUND OF THE INVENTION

1. Field of the Invention

The present invention relates, in general, to technology for estimating the transmission torque of a dry clutch arranged between the engine and the transmission of a vehicle and, more particularly, to technology for exactly estimating a relationship between the actuating stroke of an actuator and the transmission torque of a dry clutch used for an automated transmission such as an Automated Manual Transmission (AMT) so that the dry clutch can be suitably controlled using the actuator.

2. Description of Related Art

An automated manual transmission, such as an AMT or a Double Clutch Transmission (DCT), is a system for automatically controlling a manual transmission mechanism, and is configured to transmit the torque of an engine to a gear-shift mechanism using a dry clutch, unlike a typical Automatic Transmission (A/T) that uses a torque converter and a wet multi-plate clutch.

The dry clutch has the characteristics of its transmission torque greatly varying with a plurality of factors, such as the allowance of each of several components, an abrasion degree caused by the progress of endurance, thermal deformation caused by high temperature, and a variation in the friction factor of a disk, thus making it difficult to estimate torque transmitted to the dry clutch during the driving of a vehicle.

The dry clutch is controlled by an actuator, and the actuator is typically controlled by a Torque-Speed (T-S) curve indicating a variation in the transmission torque of the dry clutch relative to the stroke of the actuator. As described above, since the transmission torque of the dry clutch varies greatly due to various factors, when the variation in the transmission torque can be neither sensed nor exactly reflected during the control of the dry clutch, an excessive slip of the dry clutch may occur or a shock may be caused in the dry clutch, thus requiring an algorithm for estimating the torque characteristics of the dry clutch in real time.

The foregoing is intended merely to aid in the better understanding of the background of the present invention, and is not intended to mean that the present invention falls within the purview of the related art that is already known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of estimating the transmission torque of the dry clutch of a vehicle, which can suitably estimate a variation in the characteristics of transmission torque relative to the actuator stroke of a dry clutch even during the driving of a vehicle, so that the dry clutch is more suitably controlled, thus acquiring the feeling of soft gear shift by preventing a gear shift shock and ensuring the durability of the dry clutch by preventing an excessive slip of the dry clutch.

In an aspect of the present invention, a method of estimating transmission torque of a dry clutch, may include a) slowly releasing a dry clutch until a slip of the dry clutch occurs, b) acquiring and storing stroke of an actuator and torque of an engine at a starting time point at which the slip of the dry clutch occurs at step a), and c) determining the stroke of the actuator and the transmission torque of the dry clutch at the starting time point at which the slip of the dry clutch occurs, by using the stroke of the actuator and the torque of the engine stored at step b).

The step a) is configured to slowly release the dry clutch to such an extent that the starting time point of occurrence of the slip of the dry clutch is exactly sensed at least at a level of a minimum unit control value of the actuator.

The step b) is configured such that the stroke of the actuator and the torque of the engine at the starting point of the occurrence of the slip of the dry clutch are inversely determined and stored using a slip amount at a slip determination time point at which the slip of the dry clutch is determined to has occurred at the step a).

Step c) is configured to determine the transmission torque of the dry clutch relative to the stroke of the actuator at the starting time point, at which the slip of the dry clutch occurs, to be the torque of the engine at the starting time point of the occurrence of the slip in consideration of a relationship indicating that the torque of the engine and the transmission torque of the dry clutch at the starting time point of the occurrence of the slip of the dry clutch are identical to each other.

After step c), d) incorporating a relationship between the transmission torque and the stroke of the actuator determined at the step c) into a Torque-Speed (T-S) curve.

The method may further include before step a), e) determining whether the dry clutch is engaged, wherein step a) is performed only when the dry clutch is engaged and is then locked, and wherein the dry clutch is restored back to a locked state after the step a) and step b) have been completed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
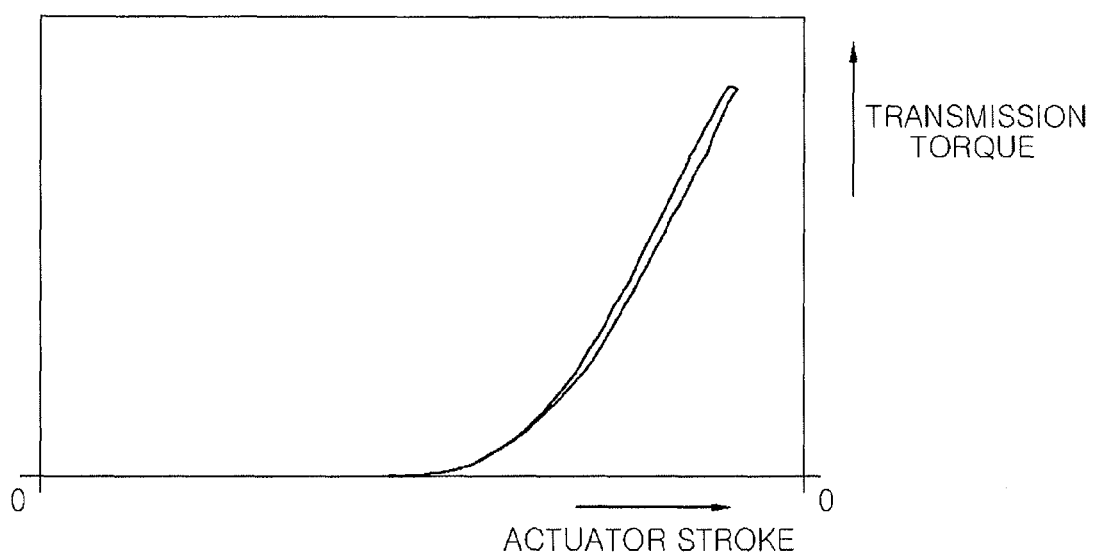
FIG. 1 is a diagram showing an example of a T-S curve indicating a variation in the transmission torque of a dry clutch relative to the stoke of an actuator.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the attached drawings.

Reference now should be made to the drawings, in which the same reference numerals are used throughout the different drawings to designate the same or similar components.

Figure 2:
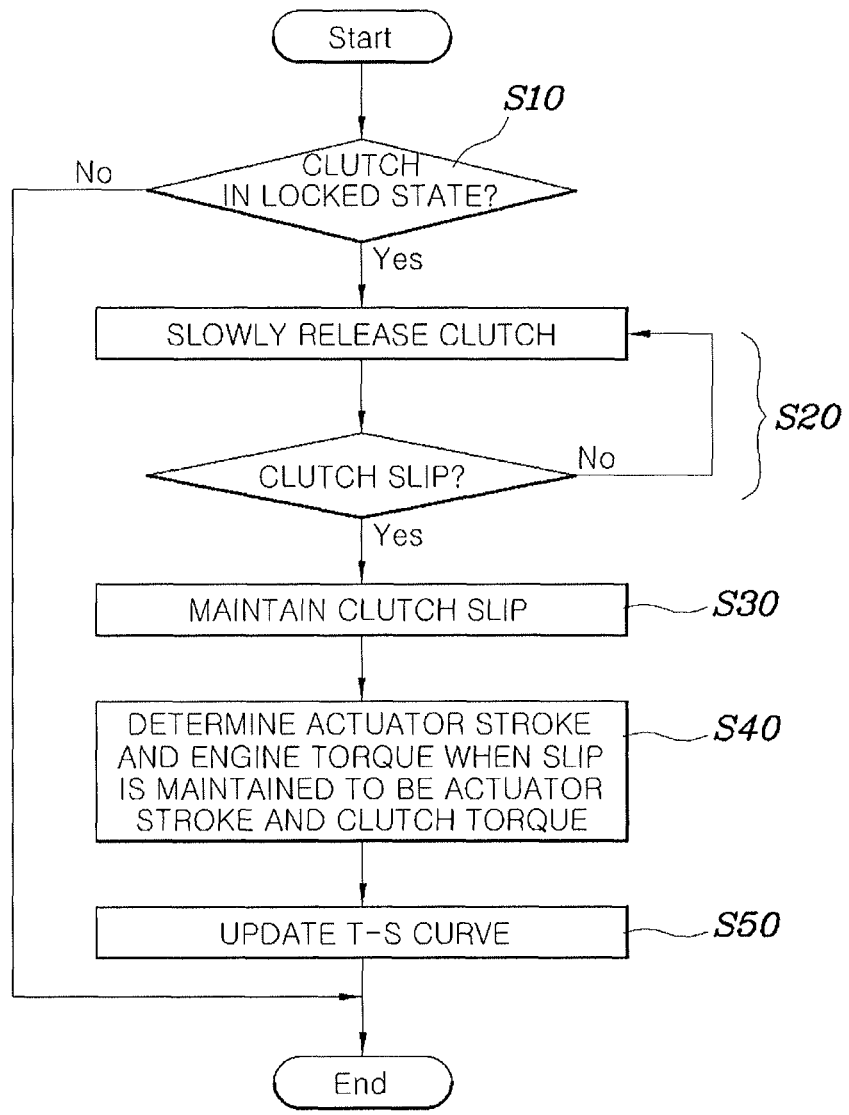
FIG. 2 is a flowchart showing an exemplary embodiment of a method of estimating the transmission torque of the dry clutch of a vehicle according to an exemplary embodiment of the present invention.
Figure 3:
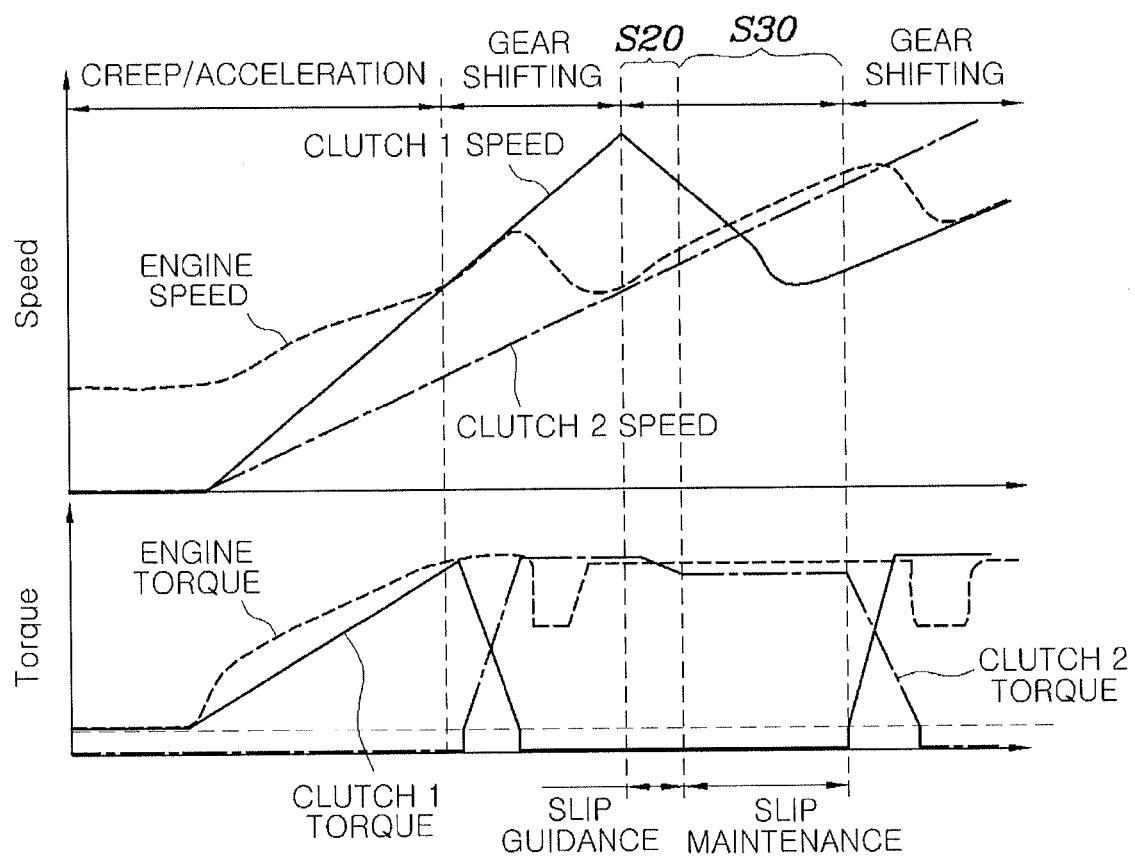
FIG. 3 is a diagram showing the method of estimating the transmission torque of the dry clutch of a vehicle according to an exemplary embodiment of the present invention, by means of graphs of variations in the torque and speed of an engine and the dry clutch over time.

Referring to FIG. 2, an exemplary embodiment of a method of estimating the transmission torque of the dry clutch of a vehicle according to an exemplary embodiment of the present invention includes the slip guidance step S20 of slowly releasing the dry clutch until a slip occurs, the data acquisition step S30 of acquiring and storing the stroke of an actuator and the torque of an engine at the starting time point at which the slip of the dry clutch occurs at the slip guidance step S20, and the transmission torque determination step S40 of determining the stroke of the actuator and the transmission torque of the dry clutch at a starting time point at which the slip of the dry clutch occurs by using the stroke and the engine torque stored at the data acquisition step S30.

Before the slip guidance step S20, the clutch lock determination step S10 of determining whether the dry clutch is engaged is performed. Only if the dry clutch is engaged and locked is the slip guidance step S20 performed. After the slip guidance step S20 and the data acquisition step S30 have been completed, the dry clutch is restored back to the locked state.

That is, the dry clutch engaged in the locked state is intentionally slipped to a degree in which the slip can be observed at the slip guidance step S20. The actuator stroke and the engine torque at the starting time point at which the slip occurs are detected. By using the actuator stroke and the engine torque, the actuator stroke and the transmission torque of the dry clutch at the starting time point of the occurrence of the slip are determined at the transmission torque determination step S40, so that a current Torque-Speed (T-S) curve is updated using the determined actuator stroke and transmission torque. Accordingly, after that, the actuator can control the dry clutch based on the updated T-S curve, thus enabling the transmission torque of the dry clutch to be more exactly controlled. Consequently, the occurrence of a gear-shift shock is prevented and an unnecessary slip of the dry clutch is also prevented, so that the feeling of gear shift can be improved and the durability of the dry clutch can be enhanced.

At the slip guidance step S20, it is preferable to slowly release the dry clutch to such an extent that the starting time point of the occurrence of the slip of the dry clutch can be exactly sensed even at the level of the minimum unit control value of the actuator.

That is, at the slip guidance step S20, when the dry clutch is released too quickly, it is difficult to determine a place where the stroke of the actuator is located when the slip occurred, so that it is preferable to slowly release the dry clutch to such an extent that the starting time point of the occurrence of the slip can be identified even at the level of the minimum unit control value of the actuator upon controlling the actuator stroke, in order to estimate the more exact transmission torque of the dry clutch.

Of course, during the driving of the vehicle, in consideration of the safety of electric power transmission or the like, the performance of the slip guidance step S20 needs to be limited within a suitable time.

At the data acquisition step S30, the actuator stroke and the engine torque at the starting time point at which the slip of the dry clutch occurs are inversely calculated and then stored using the amount of slip at the slip determination time point at which it is determined that the slip of the dry clutch has occurred at the slip guidance step S20.

That is, even if the slip of the dry clutch starts to occur, at the starting time point of the occurrence of the slip, the speed of the clutch and the speed of the engine are identical to each other, thus making it difficult to detect the occurrence of a slip. Therefore, the occurrence of the slip is detected, and the starting time point at which the slip of the dry clutch actually starts is inversely calculated using the amount of slip that indicates a difference between the speed of the engine and the speed of the dry clutch at the slip determination time point at which it is determined that the slip has actually occurred.

At the transmission torque determination step S40, the transmission torque of the dry clutch relative to the actuator stroke at the starting time point of the occurrence of the slip of the dry clutch is determined to be the engine torque at the starting time point of the occurrence of the slip in consideration of a relationship indicating that the engine torque and the transmission torque of the dry clutch at the starting time point of the occurrence of the slip of the dry clutch are identical to each other.

That is, since it can be considered that at the starting time point at which the slip of the dry clutch occurs, the engine torque and the transmission torque of the dry clutch are identical to each other, the transmission torque of the dry clutch is determined to be the engine torque using the above relationship.

Of course, after the transmission torque determination step S40, the update step S50 of incorporating the relationship between the transmission torque and the actuator stroke, determined at the transmission torque determination step S40, into the T-S curve is performed. Thereafter, the actuator is controlled based on the updated T-S curve, so that the dry clutch can be more exactly controlled, thus improving the feeling of gear shift and ensuring the durability of the dry clutch.

As described above, the present invention is advantageous in that it can suitably estimate a variation in the characteristics of transmission torque relative to the actuator stroke of a dry clutch even during the driving of a vehicle, so that the dry clutch is more suitably controlled, thus acquiring the feeling of soft gear shift by preventing a gear shift shock and ensuring the durability of the dry clutch by preventing an excessive slip of the dry clutch.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of estimating transmission torque of a dry clutch in an automated manual transmission (ATM), comprising:
   a) slowly releasing, by the ATM, a dry clutch until a slip of the dry clutch occurs;
   b) acquiring and storing, by the ATM, stroke length of an actuator and torque of an engine at a starting time point at which the slip of the dry clutch occurs at step a); and
   c) determining, by the ATM, the stroke length of the actuator and the transmission torque of the dry clutch at the starting time point at which the slip of the dry clutch occurs, by using the stroke length of the actuator and the torque of the engine stored at step b).

2. The method of claim 1, wherein the step a) is configured, by the ATM, to slowly release the dry clutch to such an extent that the starting time point of occurrence of the slip of the dry clutch is exactly sensed at least at a level of a minimum unit control value of the actuator.

3. The method of claim 1, wherein the step b) is configured, by the ATM, such that the stroke length of the actuator and the torque of the engine at the starting point of the occurrence of the slip of the dry clutch are inversely determined and stored using a slip amount at a slip determination time point at which the slip of the dry clutch is determined to has occurred at the step a).

4. The method of claim 1, wherein step c) is configured, by the ATM, to determine the transmission torque of the dry clutch relative to the stroke length of the actuator at the starting time point, at which the slip of the dry clutch occurs, to be the torque of the engine at the starting time point of the occurrence of the slip in consideration of a relationship indicating that the torque of the engine and the transmission torque of the dry clutch at the starting time point of the occurrence of the slip of the dry clutch are identical to each other.

5. The method of claim 1, further comprising: after step c),
   d) incorporating, by the ATM, a relationship between the transmission torque and the stroke length of the actuator determined at the step c) into a Torque-Speed (T-S) curve.

6. The method of claim 1, further comprising: before step a),
   e) determining, by the ATM, whether the dry clutch is engaged,
   wherein step a) is performed only when the dry clutch is engaged and is then locked, and
   wherein the dry clutch is restored back to a locked state after the step a) and step b) have been completed.

* * * * *